United States Patent
Schlecht et al.

(10) Patent No.: US 6,739,375 B2
(45) Date of Patent: May 25, 2004

(54) WINDOW WITH A WINDUP WINDOW SHADE FASTENED THEREON

(75) Inventors: Werner P. Schlecht, Vaihingen/Enz (DE); Herbert Walter, Ebersbach (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 09/989,403

(22) Filed: Nov. 21, 2001

(65) Prior Publication Data

US 2002/0059989 A1 May 23, 2002

(30) Foreign Application Priority Data

Nov. 22, 2000 (DE) .......................... 100 57 759

(51) Int. Cl.[7] ................................. B60J 3/00
(52) U.S. Cl. .................. 160/370.22; 296/97.8
(58) Field of Search ................ 160/265, 370.22, 160/310, 23.1; 296/97.7, 97.8, 37.16

(56) References Cited

U.S. PATENT DOCUMENTS

| | | | | |
|---|---|---|---|---|
| 4,998,576 A | * | 3/1991 | Moreno | |
| 5,201,810 A | * | 4/1993 | Ojima et al. | |
| 5,560,668 A | | 10/1996 | Li | |

FOREIGN PATENT DOCUMENTS

| | | |
|---|---|---|
| DE | 34 13 966 A1 | 10/1985 |
| DE | 34 15 930 A1 | 10/1985 |
| DE | 38 13 024 | 7/1989 |
| DE | 196 19 474 | 11/1997 |
| EP | 0 834 414 A2 | 4/1998 |

* cited by examiner

Primary Examiner—Blair M. Johnson
(74) Attorney, Agent, or Firm—Venable LLP; Stuart I. Smith

(57) ABSTRACT

In connection with a window arrangement for a motor vehicle, a windup window shade has been pre-assembled on the inside of the window. The windup window shade is preassembled either completely or in its essential parts, so that assembly of the vehicle at the assembly line is considerably simplified.

20 Claims, 5 Drawing Sheets

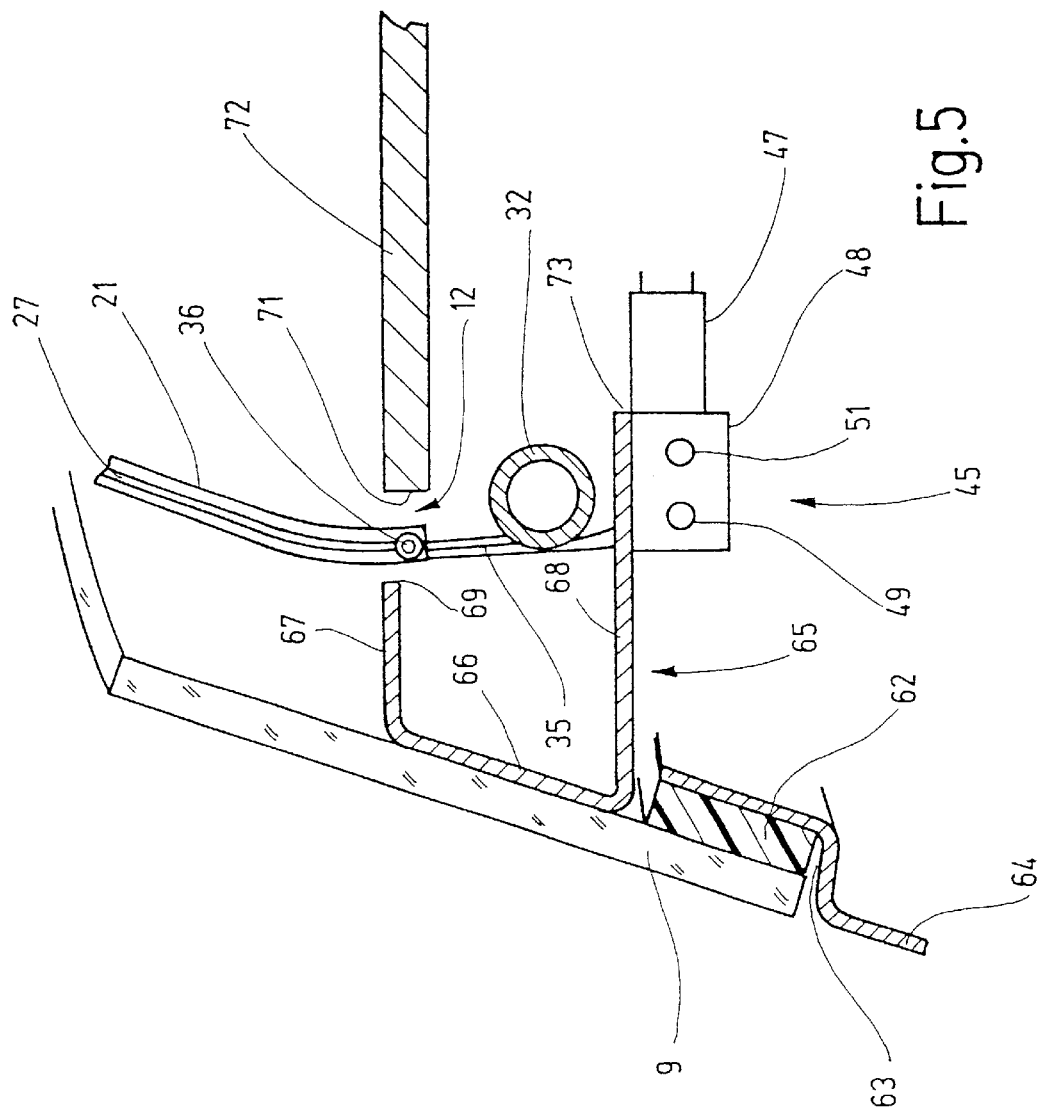

WINDOW WITH A WINDUP WINDOW SHADE FASTENED THEREON

BACKGROUND OF THE INVENTION

Modern automobile body shapes are distinguished by relatively large window areas. Because of strong sunlight, the large window areas result in considerable heat generation in the interior of the vehicle and, in connection with vehicles with air conditioning, this extensive heat generation results in a not inconsiderable use of energy in order to counteract the heating effects on the vehicle.

For this reason, motor vehicles are increasingly equipped with windup window shades.

In this connection it is known to attach two guide rails laterally next to the window, in which the end of the traction rod of the window shade web is guided. The length of the traction rod is adjustable in order to be able to accommodate various window widths. Actuation takes place by means of the thrust members running in the guide rails.

The guide rails for such windup window shades are quite filigreed structures. They are made of a light alloy and are therefore very sensitive to damage. A small force is already sufficient to destroy them, as long as they are not fastened on a solid supporting element.

It is therefore difficult to assemble the guide rails accurately in the vehicle.

Moreover, it is necessary to assemble the guide rails in the correct position in respect to the windup shaft, or the windup shaft in the correct position in respect to the guide rails. The traction rod can only be threaded into the guide rails after the windup roller and the guide rails have been assembled.

Considerable difficulties in performing this filigreed work arise during assembly on the assembly line.

Based on the foregoing it is the object of the invention to considerably simplify the assembly of the windup window shade on the assembly line.

SUMMARY OF THE INVENTION

In accordance with a first aspect of the invention, this object generally is attained by a pre-assembled window arrangement for subsequent use as a window of a motor vehicle, with the arrangement comprising: a window with an interior face that will face the interior of the motor vehicle in the assembled state of the window arrangement in a vehicle and, a windup window shade that includes: windup shaft that is rotatably seated in bearing means, at least one window shade web that is fastened by one edge on the windup shaft, at least one pair of guide rails, each of which extends laterally beside the extended window shade web, and each of which contains at least one guide groove, a traction rod that is connected with an edge of the windup window shade remote from the windup shaft, and whose respective ends are each guided in the guide grooves of the respective guide rails, and a drive mechanism for moving the traction rod along the guide rails and for rotating the windup shaft; and, wherein the guide rails are fastened at least in sections on the interior face of the window.

The above object generally is achieved according to a second aspect of the invention by pre-assembled window arrangement for subsequent use as a window of a motor vehicle, with the window arrangement comprising: a window with an interior face that will face the interior of the motor vehicle in the assembled state of the window arrangement in a vehicle and, a windup window shade that includes: a windup shaft that is rotatably seated in bearing means, at least one window shade web that is fastened by one edge on the windup shaft, at least one pair of guide rails, each of which extends beside a lateral edge of the extended window shade web, and each of which contains at least one guide groove, a traction rod that is connected with an edge of the windup window shade remote from the windup shaft, and whose respective ends are guided in the guide grooves of the respective guide rails, and a drive mechanism for moving the traction rod along the guide rails and for rotating the windup shaft (32); and wherein the bearing means for the windup shaft are fastened on the interior face of the window.

The considerable simplification of the assembly is achieved when the guide rails are already glued together, at least partially, with the window by the manufacturer. The window is a very stable component, which lends a corresponding stability to the guide rails as long as they are glued together with the window at least in part.

A particularly rugged connection is achieved if the guide rails are glued together with the window over almost the entire length. The non-glued section then possibly forms an inlet section immediately bordering the windup shaft.

It is also possible to achieve a simplification if at least the windup shaft with all associated elements is already glued together with the respective window by the manufacturer of the windup window shade. At the assembly point on the assembly line it is then only necessary to glue in the window and to make the connection with the guide rails. This can be further simplified if short guide rail pieces have already been fastened on the window, into the end of which the traction rod has already previously been threaded. It is then possible without problems to connect these guide rail pieces with the finished guide rails on the assembly line.

Preferably the guide rails are connected with the respective window over the entire length by means of a connection incorporated in the material.

A bracket can be employed for seating the windup shaft, which is simultaneously used for maintaining the drive motor. If it is useful for reasons of stability and weight, or for other reasons, it is also possible to fasten the bearing means independently of the gear motor.

With strongly curved windows it is advantageous if a bracket, which forms a straight edge pointing away from the inside, is glued to the inside of the window. In the assembled state, the top of the bracket constitutes a section of the rear window shelf, while the edge of the bracket simultaneously represents an edge of the outlet slit of the blind.

The guide grooves in which the traction rod moves are preferably undercut grooves, so that they are capable of simultaneously serving as guide tubes for the thrust members. In the case of thrust members, they are able to maintain the thrust members secure against kinking.

The drive mechanism for the windup window shade of the window arrangement becomes very simple if a spring drive is provided, by means of which the windup shaft is biased in the direction of winding up the windup window shade. In this case it is possible to use an electric motor for driving the traction rod. The electric motor determines the departure position of the windup window shade, while the windup shaft follows correspondingly.

In the simplest case the thrust members are linearly-shaped thrust members, because these can be easily housed underneath the rear window shelf, so that it is not necessary to house any thrust members or thrust mechanisms at the other end of the windup window shade, which is remote from the windup shaft.

The window shade web consists of a woven material or a perforated foil, which is dyed more or less dark.

Further embodiments of the invention are inter alia subject of dependent claims. It is intended here that also those combinations of characteristics are considered to be claimed, for which there is no explicit exemplary embodiment.

Exemplary embodiments of the subject of the invention are represented in the drawings.

BRIEF DESCRIPTION OF THE DRAWINGS

FIG. 5 shows the exemplary embodiment in accordance with FIG. 4 in a similar representation, but in a sectional view in the vicinity of the center of the windup shaft.

DESCRIPTION OF THE PREFERRED EMBODIMENTS

Figure 1:
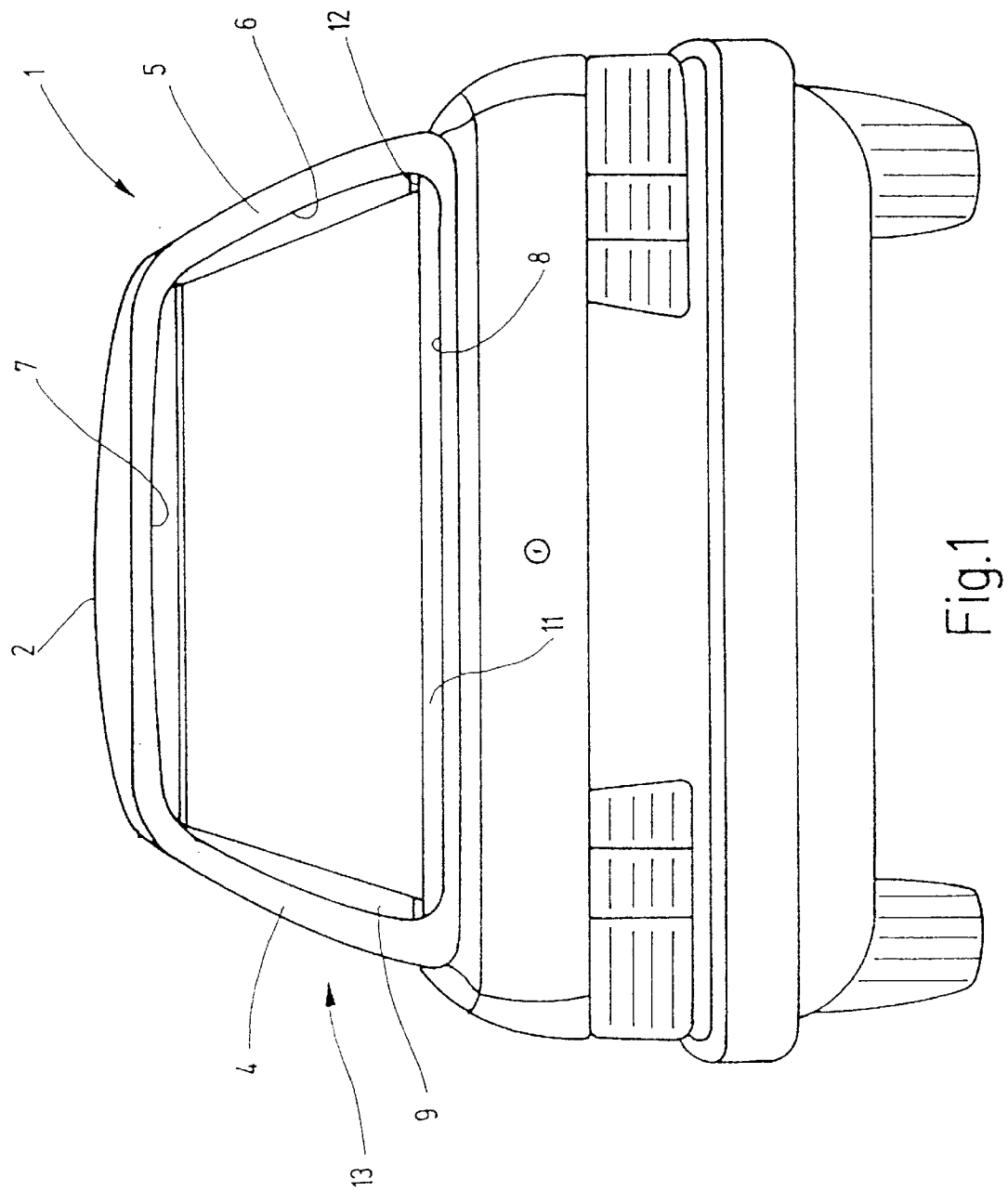
FIG. 1 shows a passenger car in a rear view, showing a rear window windup shade in accordance with the invention in the extended state.

In a schematic representation, FIG. 1 shows a rear view of a passenger car 1, having a roof 2, a trunk 3, as well as two C- pillars 4 and 5. A rear window opening 6, which is bordered at the top by a rear edge 7 of the roof and on the bottom by a lower window edge 8, is located between the two C-pillars 4 and 5. A rear window 9 is seated in the rear window opening 6, glued in in a known manner, for example by means of a rubber window strip.

A rear window shelf 11 is located in the interior of the passenger car 1 in front of the rear window 9, which horizontally extends between the lower window edge 8 and the backrest of a rear seat, not visible in the drawing. A straight outlet slit 12 extends in the rear window shelf 9.

Figure 2:
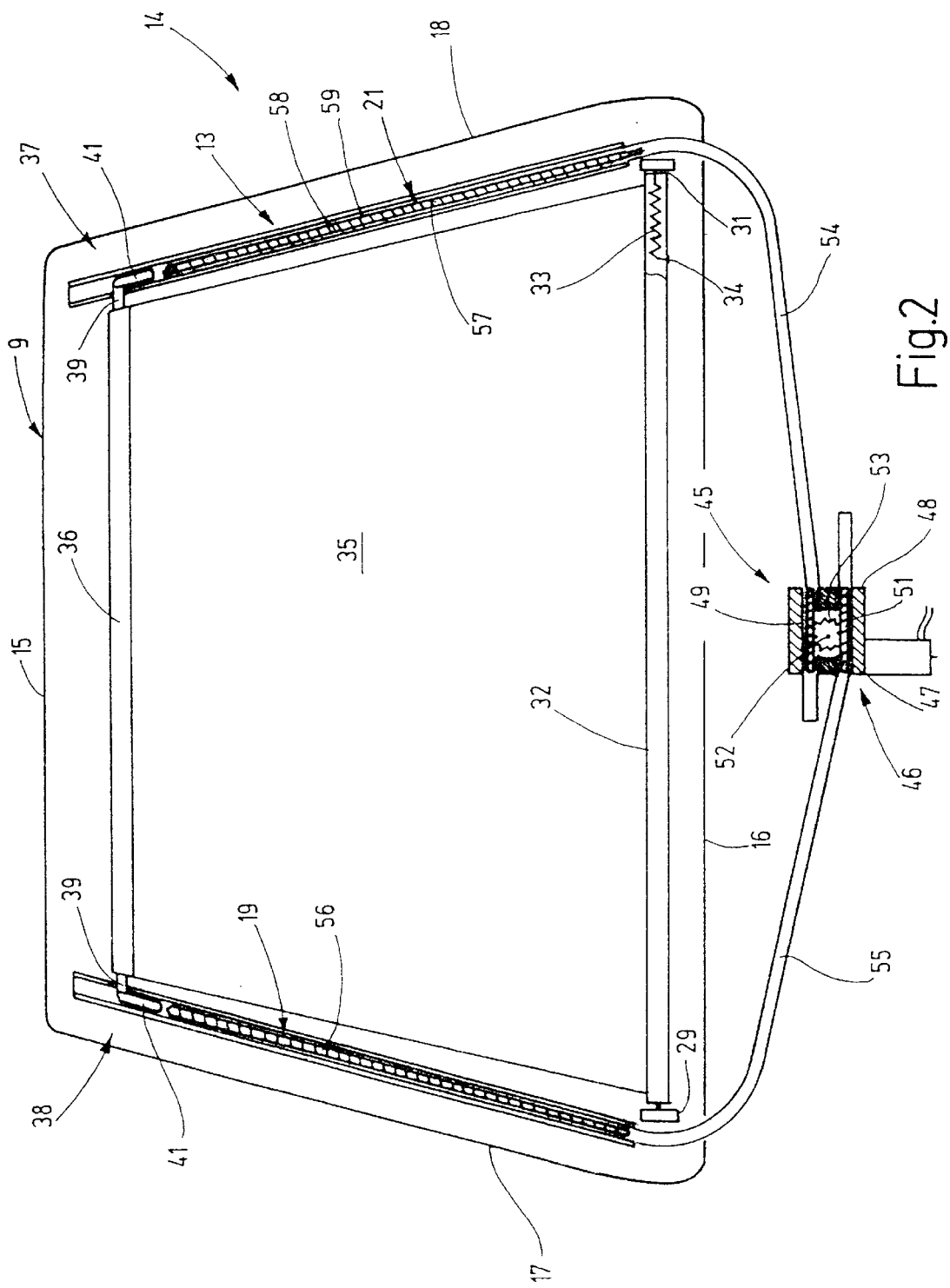
FIG. 2 shows the basic structure of the rear window windup shade in accordance with FIG. 1 in a view from above.

The outlet slit 12 is a part of a rear window windup shade 13, whose basic structure is shown, greatly schematized, in a view from above in FIG. 2.

FIG. 2 shows a window arrangement 14, consisting of the rear window 9 and the rear windup window shade 13 fastened thereon.

The rear window 9 is bordered by two window edges 15 and 16, which are essentially parallel with each other, as well as by two lateral window edges 17 and 18, which converge toward each other. The contours of the window edges 15 to 18 are matched to the contours of the rear window opening 6.

The rear windup window shade 13 it at least partially fastened on the side of the rear window 9.

The rear window windup shade 13 has two guide rails 19 and 21, which extend next to the lateral edges 17 and 18 of the rear window 9 and are spaced apart from these edges 17, 18. In FIG. 2, the guide rails 19 and 21 are shown cut open. Individually, they have the cross-sectional profile which can be seen in FIG. 3.

Figure 3:
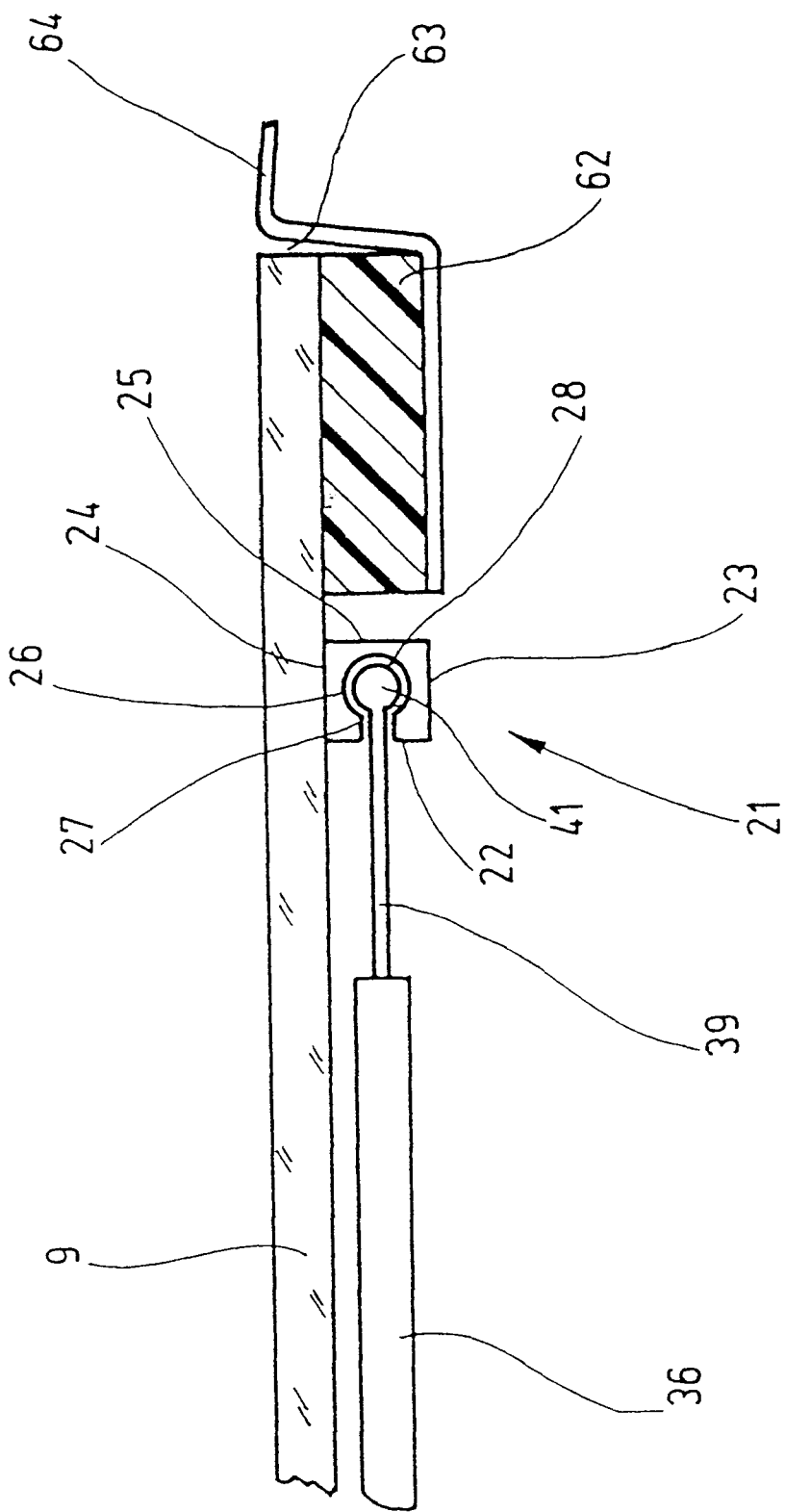
FIG. 3 shows the window arrangement in accordance with FIG. 1 in parts in a cross section parallel with the traction rod.

The cross section is essentially square and is bordered by a front 22, two lateral walls 23, 24, and by a back 25. An undercut guide groove 26, which continues with a constant cross section over the length of the guide rail 21, leads from the front 22 into the interior of the guide groove 21. As can be seen in FIG. 3, the groove profile is composed of a slit 27, open in the direction of the front 22, and a circular section 28. The guide rail 21 is glued together with the lateral surface 24 over the entire length of the rear window 9.

The guide rail 19 has the same cross-sectional profile and is glued on the rear window 9 in a mirror-reversed manner in respect to the guide rail 21. The guide slits 27 open in the direction toward each other.

Two bearing brackets 29 and 31 are glued on in the vicinity of the lower window edge 16 and at a distance to the lower window edge 16, between which a windup shaft 32 is rotatably seated. The windup shaft 32 is tube-shaped and houses a spring drive 33 in the form of a helical spring, as can be seen in the broken-open portion at the right. One end of the helical spring is fastened in the interior of the windup shaft tube and the other end is fixed in place on the seating bracket 31.

A window shade web 35 is fastened with one edge on the windup shaft 32, whose other edge 36, which is parallel with the windup shaft 32, is wrapped over to form a hose-shaped loop. A traction rod, of which only laterally projecting end or guide elements 37 and 38 can be seen, has been inserted into the loop 36. The guide elements 37, 38 are embodied mirror-reversed in respect to each other and have been inserted into a profiled tube contained in the loop 36. The guide element 38 has an L-shaped form and is composed of an oblong arm 39 and a guide member 41. The cross section of the arm 39 has been selected in such a way that it fits through the slit 27 of the guide groove 26. But the guide member 41 is matched to the cross section of the circular element 28 of the guide groove 26, as can be seen in the view from above in FIG. 3.

Since, as mentioned, the guide element 37 has a mirror-reversed structure, another description is not necessary. It suffices to provide corresponding elements with the same reference numerals as those used in connection with the guide element 38.

A further drive mechanism 45, which is represented in a largely schematic manner, is provided for extending the window shade web 35.

A gear motor 46 is a part of the drive mechanism 45, which is composed of a permanently excited d.c. motor 47 and a gear housing 48. Two guide channels 49 and 51 are contained parallel to each other in the gear housing, between which an output gear wheel 53 is provided on an output shaft 52. The output gear wheel 53 can be selectively put into motion in both directions of rotation by means of the output shaft 52, which is connected with it, fixed against relative rotation.

A guide tube 54 runs from the guide channel 49 to the lower end of the guide groove 21 and is aligned there with the circular profiled element 28 of the guide groove 26.

A further guide tube 55 connects the left end of the guide channel 51 with the lower end of the guide groove 19 in an analogously identical manner.

A flectionally elastic thrust member 56, or 57, respectively extends through the guide channel 49, as well as through the guide channel 51. The respectively unused portion of the thrust members 56, 57 is pushed back into reservoir tubes, represented in a broken manner, which extend from the respectively other end of the guide channels 49, 51.

The two thrust members 56, 57 are identically constructed. Each consists of an elastically flexible core 58, which has one or several ribs 59 on its exterior. The ribs 59 form a single- or multi-start screw thread on the exterior. The ribs 59 protrude radially and run helically over the cylindrical core 58 from one end of the thrust member to the other end. The output gear wheel 53 has teeth which can enter between the grooves formed by the ribs 59. In this way the output gear wheel 72 is interlockingly coupled with the thrust members 56 and 57.

The assembly of the described window arrangement takes place as follows:

The two guide rails 19 and 21 are glued with the aid of templates in their correct positions on the inside of the ready rear window 9. Thereafter, the bearing brackets 29 and 31 are also glued on, and the windup shaft 32, on which the window shade web 35 had been previously wound, is installed between the two bearing brackets 29 and 31.

The window shade web 35 has been prefabricated and has a trapezoidal shape, as well as the loop 36 at the end.

The traction rod, whose two guide elements 37, 38 project laterally, has been inserted into the loop.

It is now possible to pull the window shade web off the windup shaft 32, and the guide members 41 are threaded into the guide grooves 26 at the upper end of the guide rails 19, 21. After releasing the respective edge, the spring drive 33 starts the windup shaft 32 in the windup direction.

At the end of the assembly, the traction rod with the guide elements 37 and 38 rests against the bearing brackets 29 and 31, without the guide members 41 being able to come free of the guide rails 19 and 21.

Thus, the window arrangement 14 has been prefabricated by the manufacturer and can be delivered to the assembly line.

In the course of the assembly of the vehicle, the rear window 9 equipped with elements of the rear window windup window shade 13 is inserted into the window opening in a known manner. As FIG. 3 shows, to this end the edge area of the rear window 9 located past the guide rails 19, 21, together with a rubber window strip 62 is glued in a known manner into a window rabbet 63 of a piece 63 of body sheet metal. Gluing takes place in the same way also next to the lower and the upper window edges 15 and 16. As soon as the rear window 9 has been glued in, the guide tubes 54, 55 are connected to the drive mechanism 45, whose gear motor is fastened, for example separate from the rear window 9, at a different location in the car body 5.

The functioning of the described rear window windup window shade is as follows:

In the position of rest, the windup shaft 23 has been rotated by the action of the spring drive 34 into a position in which the window shade web 35 is wound up. In this position the hose-like loop 36 is located in the outlet slit 12. The guide elements 37, 38 are located in the vicinity of the lower ends of the two guide rails 19, 21, but without the guide members 41 having been released out of the associated guide grooves 26.

At the same time the two ends of the thrust members 56 and 57 are spaced apart from the respective guide members 41.

If, starting from this position of the rear windup window shade 13, in which the entry of light into the vehicle interior is not hampered at all, the user would like to create a shading effect, he would extend the window shade web 35. The window shade web 35 reduces the entry of light, but without stopping it completely. For this purpose the window shade web 35 is made, for example, of an open chain weave, or a perforated plastic foil, which is colored black.

To extend the window shade web 35, the gear motor 46 is put into operation in a direction of rotation in which it moves the thrust member 57 toward the right through the guide groove 19. Since the two thrust members 56 and 57 mesh with the output gear wheel 53 at diametrically opposite ends, the thrust member 57 is simultaneously pushed forward toward the left through the guide groove 19 of the left guide rail 13. After a short distance over the advance path, the free ends of the two thrust members 56 and 57 come into engagement with the lower ends of the guide members 41 of the two guide elements 37, 38 in the direction toward the upper end of the two guide rails 19 and 21.

Since the distance between the guide rails changes, the legs 39 of the guide elements 37, 38 simultaneously dip telescope-like into the flectionally rigid tube of the traction rod contained in the respective loop 36.

As soon as the end position has been reached, the gear motor 46 is stopped. The extended end position is represented in FIG. 5.

The gear motor 46 is self-locking and arrests the thrust members 56 and 57 in their respectively attained positions.

The switch-off of the gear motor 46 is performed with the aid of limit stop switches, or in that the guide members 38 and 39 run up against stops, so that a blocking current occurs, which is to be evaluated in an electronic device and leads to switch-off.

The window shade web 35 is now held stretched between the traction rod and the windup shaft 32.

For retraction, the gear motor 46 is started in the opposite direction of rotation, so that the two thrust members 56 and 57 are moved downward out of the associated guide rails 19, 21. The traction rod simultaneously moves downward, because the window shade web 35 is constantly kept under tension by the action of the spring drive 33 of the windup shaft 32.

The solution represented in FIG. 2 is only suitable for rear windows with axes of curvature which exclusively extend parallel with the longitudinal axis of the windup shaft 32. Only with rear windows 9 of this type can the windup shaft 32 be brought sufficiently close to the inside of the rear window 9, so that the outlet slit 12 is bordered on one side by the rear window shelf 11, and on the other side by the inside of the rear window 9. A solution such as schematically represented in FIGS. 4 and 5 is applicable to rear windows 9 of greater curvature.

Figure 4:
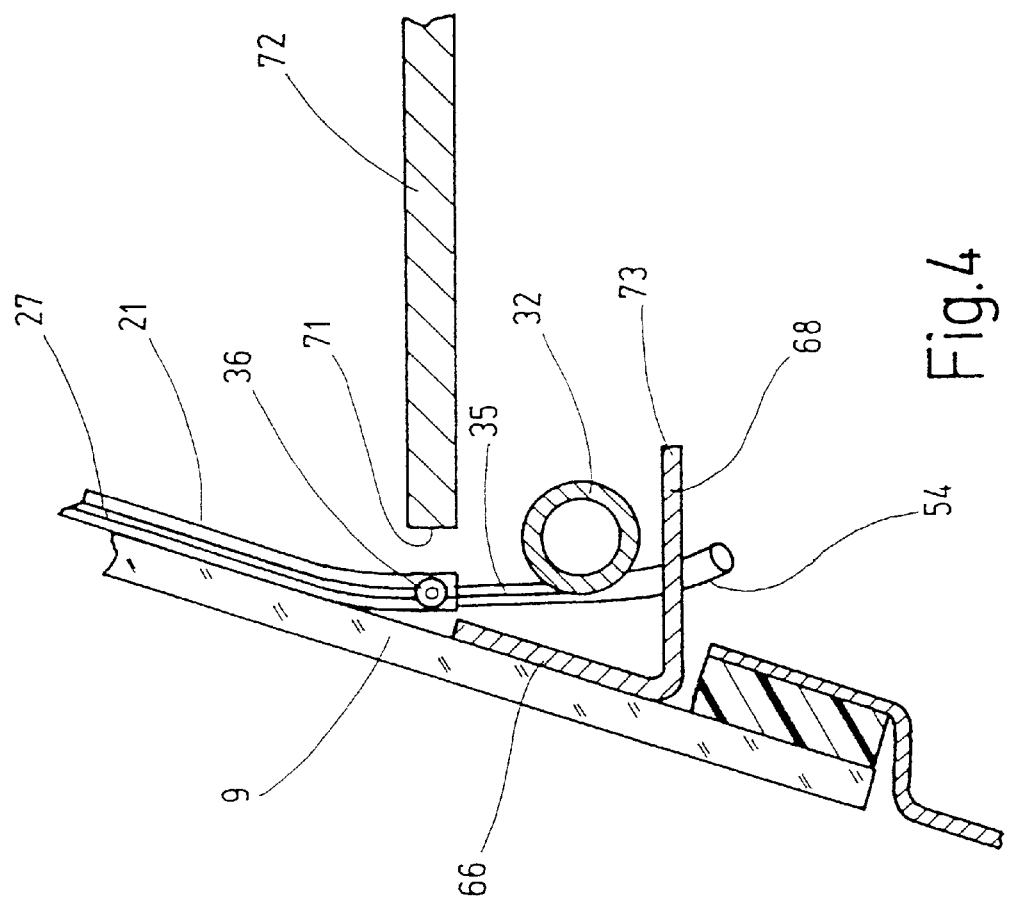
FIG. 4 shows a further exemplary embodiment of the window arrangement in accordance with the invention in a schematic simplified cross-sectional view near the windup shaft end.

FIGS. 4 and 5 represent sectional views perpendicular with the axis of the windup shaft 32, namely, the section line in FIG. 4 extends in the vicinity of one end of the windup shaft, while the other section line in FIG. 5 was taken closer to the center of the windup shaft 32.

To the extent that components appear in these figures which had already been previously described, the same reference symbols are used for this without providing another explanation.

The essential difference with the previous exemplary embodiment lies in a bracket 65, which has been glued closely above the lower window edge 26. The bracket has an essentially U-shaped cross-sectional profile and is composed of a back 66, as well as two legs 57 and 68 which extend approximately parallel with each other.

The leg 67 forms a straight edge 69 which, in the assembled state, extends at a constant distance from an edge 71 of a plate 72 arranged in the vehicle. Together, the top of the plate 72 and the top of the leg 67 form the rear window shelf 11, while the edges 69 and 71 are the edges of the outlet slit 12.

Since the window is curved, i.e. is also curved in respect to a vertical axis, the depth of the leg 67 changes from the edge of the rear window 9 toward its center. For all practical purposes, the leg 67 has completely disappeared toward the edge, as shown in FIG. 4. The back 66, however, follows the course of the rear window 9 in the strip which it covers on the inside of the rear window 9.

The lower leg 68 also extends straight at its edge 73 extending away from the back 66. The leg 68 accordingly protrudes further in the center area than in the edge area, which can be easily seen in a comparison of FIGS. 4 and 5. The lower leg 68 constitutes a rest on which the bearing brackets 29 and 31, not represented, are fastened. The drive mechanism 45 with the gear housing 48 and the drive motor 47 is fastened on its underside. The guide channels 49 and 51 are oriented toward the viewer.

So that the blind enters cleanly into the guide rails 19 and 21, these are, as shown in FIG. 4, not glued to the inside of the rear window 9, but from there point into the outlet slit 12 in such a way that the extension of the latter runs tangentially in respect to the windup shaft 32, or to the barrel consisting of the window shade web which was created there. The guide tubes 54 or 55 extend below the leg 68 to the gear housing 48.

With the exemplary embodiments of FIGS. 4 and 5, fastening of the rear window 9 is also provided in the lower area with the aid of a rubber window strip 62 in a window rabbet 63 formed in the sheet metal covering 64 of the vehicle body, the same as has already been explained in connection with FIG. 3.

In order to make the rubber window strip 62, as well as the bracket 65 invisible from the exterior, the rear window 9 is printed with black dots of different size, starting at the lower edge 16 as far as slightly above the leg 67 in a known manner.

In the embodiment in accordance with FIGS. 4 and 5 not only are the guide rails 19 and 21 and the windup shaft 32 already connected with the rear window 9 by the manufacturer, but also the entire drive mechanism 45 and a portion of the rear window shelf 11, namely the part of the rear window shelf 11 located between the inside of the rear window 9 and the outlet slit 12.

At the assembly line for the vehicle, the window arrangement 14 prefabricated in this way is simply glued into the window rabbet. No later assembly of any parts of the windup window shade is required.

In connection with a window arrangement for a motor vehicle, a windup window shade has been pre-assembled on the inside of the window. The windup window shade is preassembled either completely or in its essential parts, so that assembly of the vehicle at the assembly line is considerably simplified.

What is claimed is:

1. A window arrangement for mounting and use as a window of a motor vehicle, the arrangement comprising:
    a window having an interior face for facing an interior of the motor vehicle when mounted to the vehicle;
    a windup window shade mounted on the window, the window shade having
        a windup shaft rotatably seated in bearing means,
        at least one window shade web fastened by one edge on the windup shaft,
        at least one pair of guide rails, each extending laterally beside the window shade web, and each containing at least one guide groove,
        a traction rod that is connected to an edge of the windup window shade remote from the windup shaft, and whose respective ends are each guided in the guide grooves of the respective guide rails, and
        a drive mechanism for moving the traction rod along the guide rails and for rotating the windup shaft; and
    an elongate shelf bracket fastened to the window at a lower portion of the window and projecting away from the window on the interior face side of the window and supporting the windup window shade, the shelf bracket being parallel to the windup shaft and having a top portion that forms a rear window shelf when mounted in the motor vehicle,
    wherein the at least one pair of guide rails are fastened at least in sections on the interior face of the window.

2. The window arrangement according to claim 1 further including the bearing means for the windup shaft being fastened on the interior face of the window.

3. The window arrangement in accordance with claim 1, wherein each of the guide rails has a face with which they are fastened on the interior face of the window.

4. The window arrangement in accordance with claim 1, wherein the connection of the guide rails with the interior face of the window is a direct connection.

5. The window arrangement in accordance with claim 2, wherein the bearing means are directly connected to the interior face of the window.

6. The window arrangement in accordance with claim 1, wherein the bearing means are seated on a bracket that is fastened to the interior face of the window and to which a gear motor of the driving mechanism has also been fastened.

7. The window arrangement in accordance with claim 1, wherein a gear motor of the driving mechanism and the bearing means are fastened separately from each other on the window.

8. The window arrangement in accordance with claim 1, wherein the window is provided with a print on the exterior surface in order to hide at least one of the guide rails and the bearing means of the windup shaft from an exterior view.

9. The window arrangement in accordance with claim 1, wherein the guide grooves are undercut guide grooves.

10. The window arrangement in accordance with claim 1, wherein the window shade web consists of one of a woven material and a perforated foil.

11. The window arrangement in accordance with claim 1, wherein the traction rod is adjustable in length such that it is able to follow a changing distance between the guide grooves.

12. The window arrangement in accordance with claim 1, further comprising a spring drive that is associated with the windup shaft and clamps the windup shaft in a winding direction.

13. The window arrangement in accordance with claim 1, wherein the drive mechanism for moving the traction rod has two drive members.

14. The window arrangement in accordance with claim 13, wherein the two drive members are flexible, linear pushing members that are guided, and secured against bending, between the gear motor and the relevant guide groove.

15. The window arrangement in accordance with claim 13, wherein the two drive members are approximately cylindrical constructions that are provided on their outsides with a toothing which extends over a length of the constructions with a constant pitch.

16. The window arrangement in accordance with claim 15, wherein the toothing is a helical rib.

17. An article of manufacture for subsequent installation as a window of a motor vehicle having a wind up window shade mounted on the window, said article of manufacture consisting of: a window with an interior surface that will face the interior of a motor vehicle in the assembled state; at least one pair of spaced guide rails, each of which will extend laterally beside and guide an extended window shade web, fastened, at least in parts, on the interior surface of the window; and a shelf bracket fastened to the window at a lower portion of the window and projecting away from the window on the interior surface side of the window, the shelf bracket having a top portion for forming a rear window shelf when mounted in the motor vehicle.

18. A method of producing a windup window shade on a window of a motor vehicle, with the window shade including a windup shaft rotatably seated in bearing means, at least one window shade web fastened by one edge on the windup shaft, at least one pair of guide rails, each extending laterally beside an extended window shade web, and each containing at least one guide groove, a traction rod that is connected with an edge of the windup window shade remote from the windup shaft, and whose respective ends are each guided in the guide grooves of the respective guide rails, and a drive mechanism for moving the traction rod along the guide rails and for rotating the windup shaft; said method comprising:

providing a window with an interior surface that will face the interior of a motor vehicle in the assembled state;

fastening at least one pair of spaced guide rails, each of which will extend laterally beside and guide an extended window shade web, at least in parts, on the interior surface of the window;

transporting the window with the at least one pair of spaced guide rails to an assembly location for a motor vehicle; and installing the window with the at least one pair of guide rails fastened thereon in a motor vehicle body.

19. The method as defined in claim 18 including completing the installation of the windup window shade on the interior surface of the window after the window with at least the guide rails has been installed.

20. The method as defined in claim 18 further including fastening other parts of the windup window shade on the interior surface of the window prior to installation of the window in the vehicle body.

* * * * *